United States Patent
Sviberg

(10) Patent No.: US 9,676,255 B2
(45) Date of Patent: Jun. 13, 2017

(54) TOP OF A CONVERTIBLE VEHICLE HAVING A REAR WINDOW

(71) Applicant: Webasto-Edscha Cabrio GmbH, Stockdorf (DE)

(72) Inventor: Magnus Sviberg, Stockdorf (DE)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 0 days.

(21) Appl. No.: 14/967,559

(22) Filed: Dec. 14, 2015

(65) Prior Publication Data

US 2016/0167496 A1    Jun. 16, 2016

(30) Foreign Application Priority Data

Dec. 15, 2014  (DE) .................. 10 2014 118 660

(51) Int. Cl.
*B60J 7/12* (2006.01)
*B60J 1/18* (2006.01)
*B60J 7/06* (2006.01)

(52) U.S. Cl.
CPC ............. *B60J 1/1823* (2013.01); *B60J 7/061* (2013.01); *B60J 2007/1208* (2013.01)

(58) Field of Classification Search
CPC ... B60J 1/1823; B60J 7/061; B60J 2007/1208
USPC .................................................. 296/107.07
See application file for complete search history.

(56) References Cited

U.S. PATENT DOCUMENTS

2007/0035154 A1* 2/2007 Eisenreich ............. B60J 7/0573
296/107.01

FOREIGN PATENT DOCUMENTS

| DE | 3137351 A1 | 4/1983 |
| DE | 19847080 A1 | 4/2000 |
| DE | 19964205 A1 | 5/2001 |

* cited by examiner

*Primary Examiner* — Pinel Romain
(74) *Attorney, Agent, or Firm* — Quarles & Brady LLP

(57) ABSTRACT

A top of a convertible vehicle includes a linkage, wherein, by using the linkage, at least one top element is displaceable between a closed position for spanning a vehicle interior and a cleared position for clearing the vehicle interior to the top. By using the linkage, a rear window, which, in relation to a vertical longitudinal center plane of the top on each of its two sides, is connected to the linkage via a rear window link, is displaceable between a lifted viewing position and a lowered storage position, in which the rear window is arranged in a storage space, as well as comprising a detection apparatus. The detection apparatus identifies an obstacle in the storage space when the rear window is being displaced from the viewing position in the direction of the storage position and which interacts with a control apparatus of the top. The rear window is part of the detection apparatus.

10 Claims, 9 Drawing Sheets

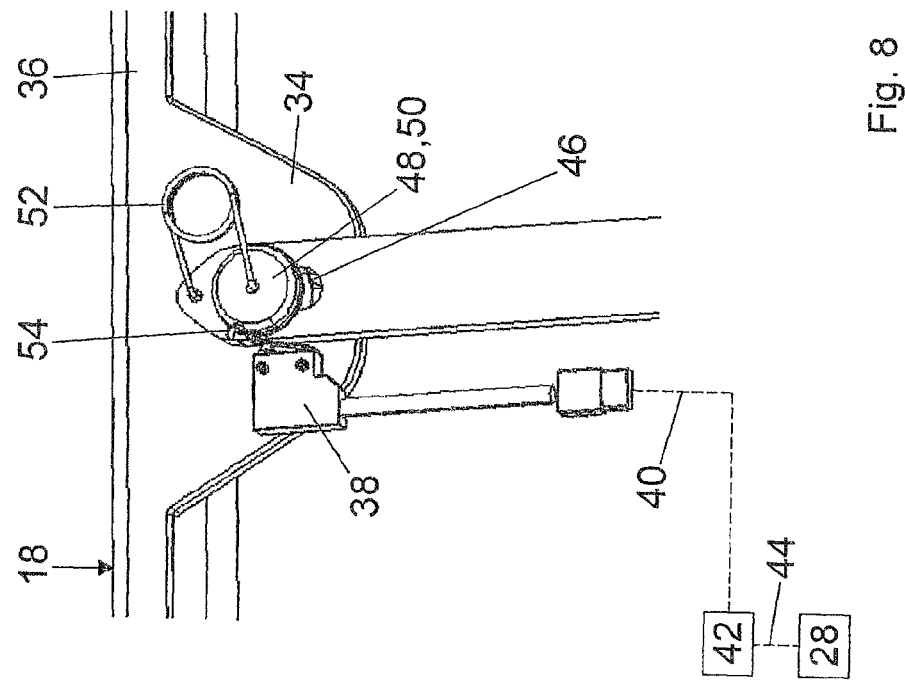
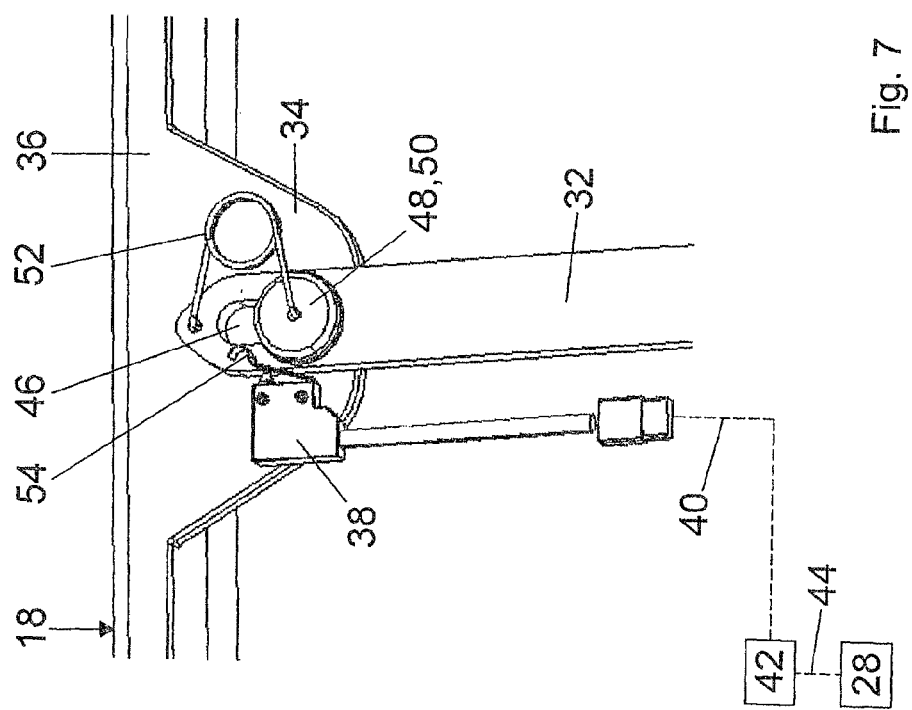
Fig. 7
Fig. 8

TOP OF A CONVERTIBLE VEHICLE HAVING A REAR WINDOW

CROSS REFERENCE TO RELATED APPLICATION

This application claims the priority benefit of German Patent Application No. 10 2014 118 660.5 filed on Dec. 15, 2014, which is fully incorporated herein by reference.

STATEMENT REGARDING FEDERALLY SPONSORED RESEARCH OR DEVELOPMENT

Not applicable.

FIELD OF THE INVENTION

The invention relates to a top of a convertible vehicle.

BACKGROUND OF THE INVENTION

Such a top is known from practice and comprises a linkage, wherein, by using said linkage, at least one top element is displaceable between a closed position for spanning a vehicle interior and a cleared position for clearing the vehicle interior to the top. The top element may be a rigid roof element extending in the transverse direction of the vehicle or also a top cloth, which is stored, in the cleared position, in a rear storage space of the relevant vehicle. Furthermore, a rear window is linked to the linkage via rear window links that are arranged, in relation to a vertical longitudinal center plane of the top, on each of its two sides, said rear window being situated, in the closed position of the top, in an erected viewing position and, when the top has been stored, is moved into a lowered storage position, in which the rear window is equally arranged in the rear storage space.

If large items, which may be called obstacles, are situated in the storage space, the top or the rear window cannot be placed into the storage space. In order to prevent this, convertible vehicles are known in which the storage space is separated from a loading space of the relevant vehicle through a separating device. The separating apparatus, however, leads to the loading space being significantly smaller, even when the top has not been stored. In order to be able to do without a separating apparatus and in order to prevent the top from being laid down when an obstacle is located in the storage space, it is known to use optical sensor elements. Such optical sensor elements, however, work unreliably, such that it cannot be precluded that the top and/or the rear window is damaged by the obstacle.

SUMMARY OF THE INVENTION

It is the object of the invention to create a top, having a detection apparatus for obstacles in the storage space that works reliably. The top according to the invention comprises a detection apparatus, which identifies an obstacle in the storage space when the rear window is being displaced from the viewing position in the direction of the storage position. The rear window is part of the detection apparatus.

In the top according to the invention, the rear window, which, when an obstacle is present in the storage space, comes into contact with said obstacle or hits it, is used as a sensor element of the detection apparatus. The rear window is usually the element of the top that, in the cleared position or storage position, forms the top element in the storage space lying furthest at the bottom. The rear window consequently is the first to come into contact with the obstacle when the top is being brought into the storage space.

In a preferred embodiment of the top according to the invention, the detection apparatus is designed such that it stops the displacement of the linkage or reverses it at least partially when the rear window hits the obstacle. For this, the detection apparatus interacts with the control apparatus of the top, that means the detection apparatus forwards a corresponding sensor or trouble signal to the control apparatus, whereupon the latter forwards a corresponding control signal to the top drive.

In a special embodiment of the top according to the invention, each of the rear window links is mounted with a clearance via a mounting hole, with which a mounting pin engages, such that the obstacle is detected when the respective mounting pin is moved in the relevant mounting hole from a nominal position. This means that the rear window may perform a movement of translation as against the rear window links. Said movement of translation from the nominal position, in which the rear window is operated without any problems relating to the rear window links, is effected if the rear window hits a hurdle, that means the obstacle, and cannot be moved into its storage position in this way.

In order to hold the nominal position of the top when no obstacle is arranged in the storage space, each of the mounting pins, in a preferred embodiment of the top according to the invention, is prestressed in the direction of the nominal position using at least one spring element.

For transmitting a sensor signal to the control apparatus of the top, each of the mounting pins, in a special embodiment of the top according to the invention, for identifying the obstacle, interacts with a microswitch, which is connected to the control apparatus. When the respective mounting pin hits the microswitch, the trouble signal is transmitted to the control apparatus being associated with the obstacle.

Expediently, a switching nose is realized at each of the mounting pins, said element switching the microswitch. For example, the mounting pins are realized as stepped rivets, including a face-side plate, which forms the switching nose for switching the microswitch.

In an alternative embodiment of the top according to the invention, a switch is provided, which functions magnetically, and is connected to the control apparatus and identifies that at least one rear window link has been offset as against the rear window. The switch that functions magnetically is, for example, a so-called Hall sensor, which is integrated into a carrier frame of the rear window and which interacts with a projection of the relevant rear window link, said projection in particular being nose-like. This means that when the projection of the rear window link is moved into the region of the switch that functions magnetically, a trouble or sensor signal is forwarded to the control apparatus, which then triggers corresponding control processes, such as stopping or reversing the actuation of the top.

In order to be able to advance the rear window in a guided fashion as against the rear window links, the mounting holes are preferably formed from an elongated hole.

Alternatively, each of the mounting holes may be formed from a large hole, preferably being circular, whose diameter is larger than the diameter of the mounting pin, wherein it is then detected if the relevant mounting pin has been deflected from the nominal position into an eccentric position in relation to the center of the large hole, using a sensor element functioning electrically, magnetically or optically.

Expediently, the mounting holes are realized at the rear window link, whereas each of the mounting pins is connected to the rear window in a rigid fashion and is then arranged at a frame of the rear window.

Further advantages and advantageous configurations of the subject-matter of the invention can be taken from the description, from the drawing and from the claims.

BRIEF DESCRIPTION OF THE DRAWINGS

In the drawing, exemplary embodiments of a top according to the invention are illustrated in a schematically simplified way and will be explained in more detail in the following description. In the figures:

FIG. 7 shows the arrangement of a rear window of the top as against a rear window link in the nominal position, with a microswitch for detecting an obstacle;

FIG. 8 shows the arrangement according to FIG. 7 when the rear window has hit the obstacle;

DETAILED DESCRIPTION OF AN EMBODIMENT

Figure 1:
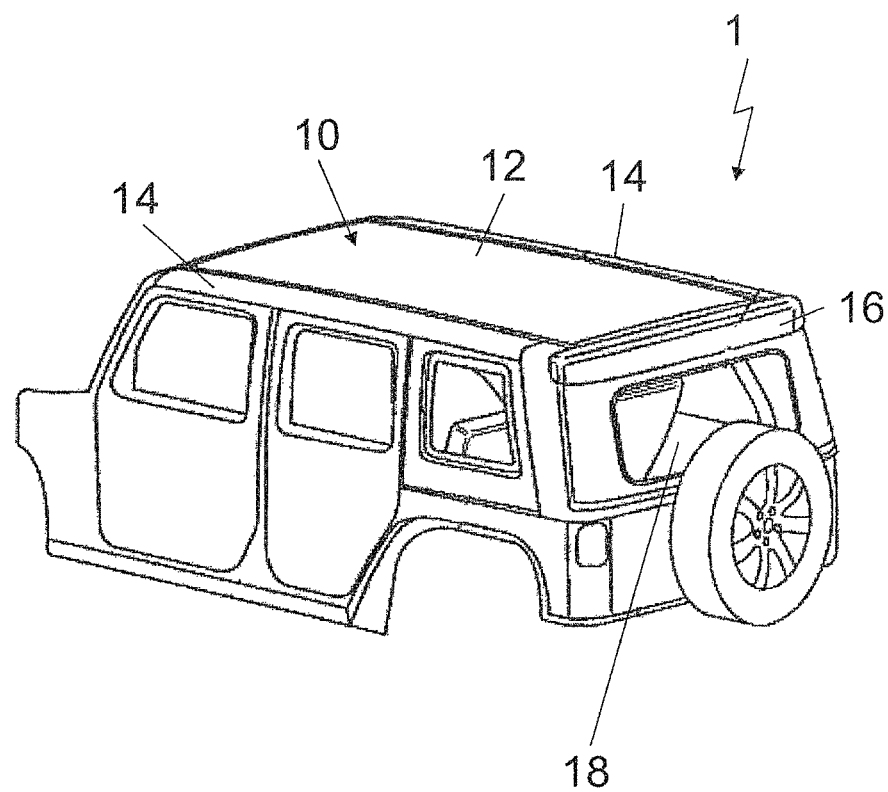
FIG. 1 shows a vehicle construction having a displaceable top in the closed position thereof.

In FIGS. 1 to 8, a top 10 is illustrated, which is a displaceable roof of a passenger car that is realized as an off-road vehicle. This means that the off-road vehicle is a convertible vehicle. The top 10, in the broadest sense, forms a folding top, which includes a folding roof portion 12, which forms the actual vehicle roof in the closed position and which is guided between two longitudinal roof struts 14 which extend in the longitudinal direction of the vehicle, and which laterally limit the vehicle roof. At its rear side, the folding roof portion 12 is linked to a roof cassette 16 which constitutes a top element, and which accommodates a displacing mechanism for the folding roof portion 12 and forms, in the closed position, a rear corner region of the vehicle roof. The top 10 comprises, in a region being arranged below the roof cassette 16 in the closed position, a rear window 18, which is equally embodied so as to be displaceable.

Figure 2:
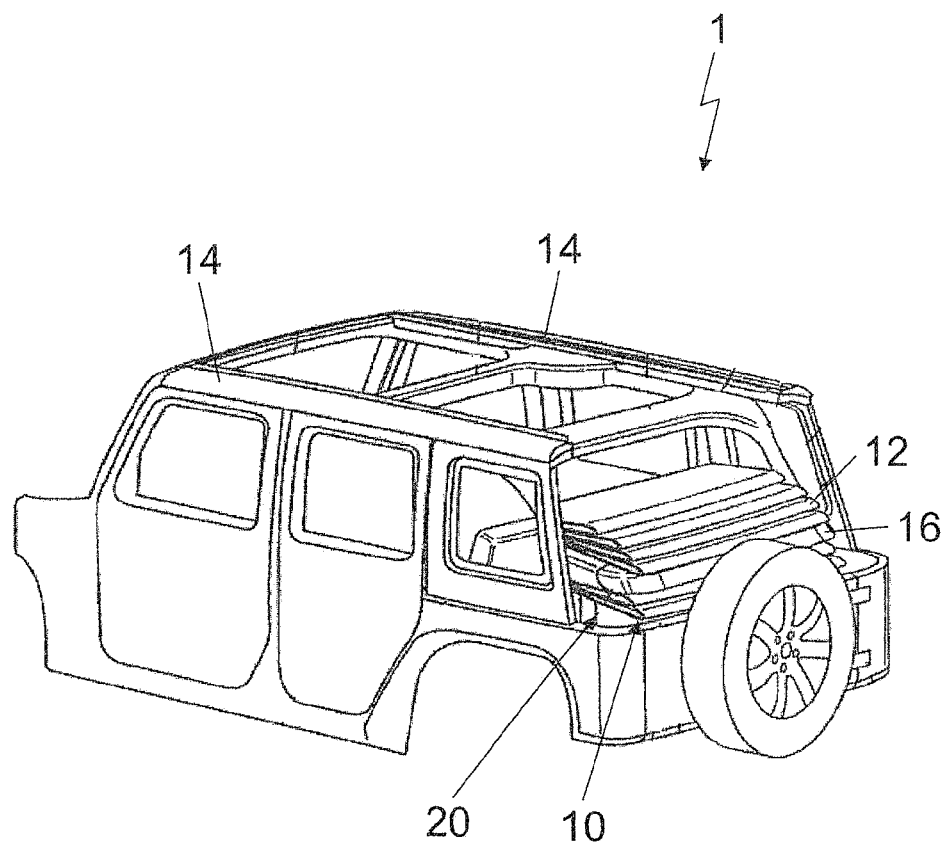
FIG. 2 shows the vehicle construction according to FIG. 1 in a cleared position of the top.

In order to move the top 10 from the closed position being illustrated in FIG. 1 into the cleared or storage position being illustrated in FIG. 2, the folding roof portion 12 is initially advanced into the roof cassette 16 in the rear direction, such that the latter may be lowered, together with the folding roof portion 12, for being accommodated in a rear storage space 20 of the vehicle construction 1. In order to be able to lower the roof cassette 16, the rear window 18 is swung forward.

In FIGS. 3 to 8, a linkage 22 is illustrated that is required for displacing the top 10, i.e. for lowering the roof cassette 16. The linkage 22, in relation to a vertical longitudinal center plane of the vehicle on each of its two sides, comprises a link arrangement 24, which is connected to a main bearing 26 so as to be pivotable, said main bearing being connected to the vehicle construction 1. The entire top 10 is mounted to the vehicle construction 1 via the main bearings 26, which are parts of the linkage 22.

For actuating the link arrangements 24, drive apparatuses 28 are arranged at the main bearings 26, comprising an electric motor and a downstream gearbox.

In FIGS. 3 to 6, only the main bearing 26 being arranged on the left in relation to the forward direction of travel of the relevant vehicle is illustrated, together with the associated link arrangement 24 and the associated drive apparatus 28. The link arrangement being arranged on the right in relation to the forward direction of travel with the accompanying main bearing and the accompanying drive apparatus is realized in a mirror-symmetrical fashion. For reasons of clarity, the detailed description thereof is therefore omitted.

Each of the link arrangements 24 is connected, via a lever 30, to a rear window link 32, which is articulated to a mounting lug 34 of a frame 36 of the rear window 18.

Figure 5:
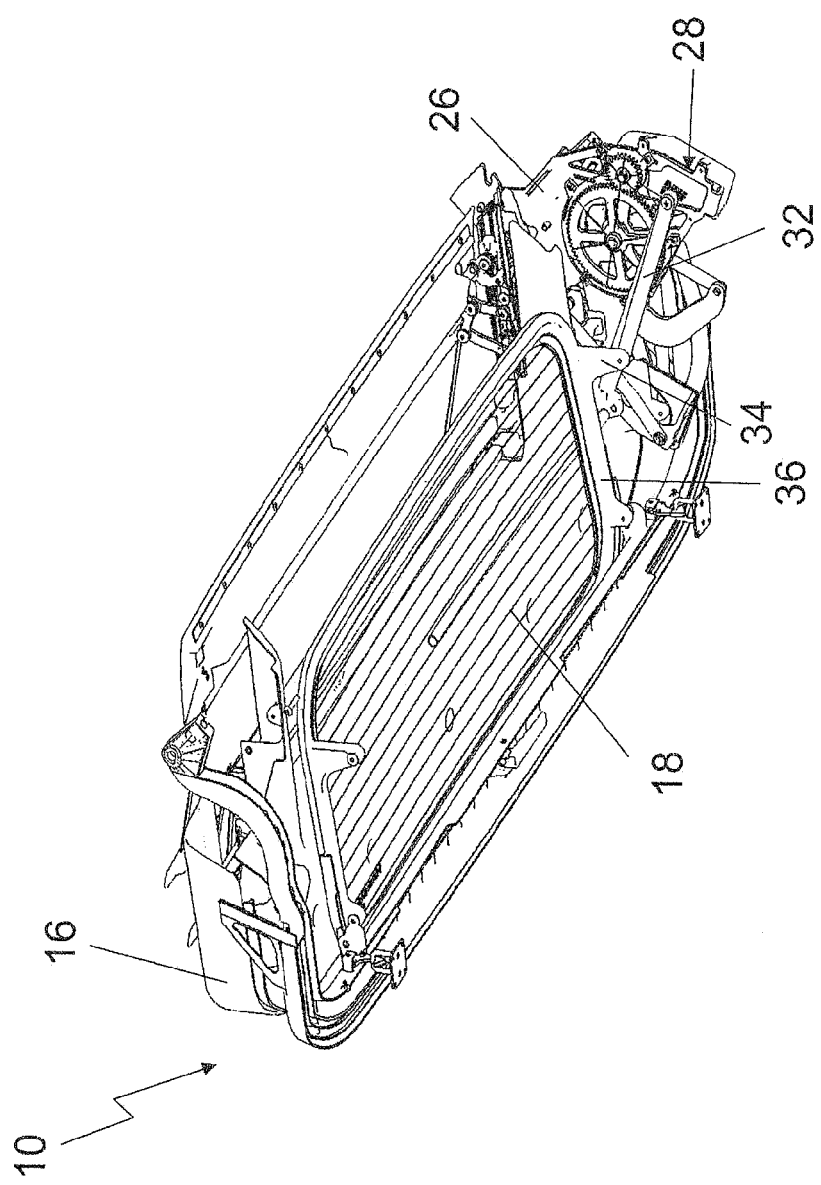
FIG. 5 shows a view of the top equally corresponding to FIG. 3, but in the cleared or storage position thereof.
Figure 6:
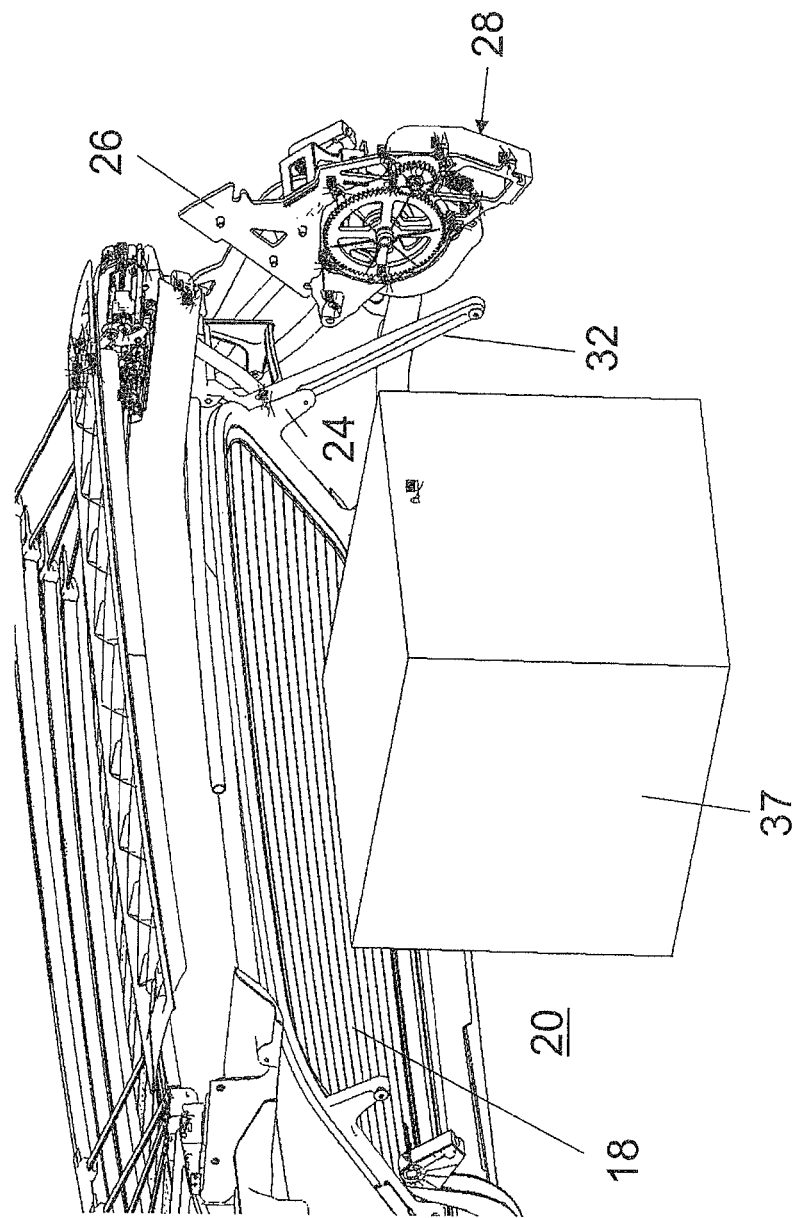
FIG. 6 shows the top in an intermediate position when an obstacle is present in a storage space.

As it can be taken from FIGS. 3 to 6, the rear window 18, starting from the erected viewing position, is pivoted into the storage position being illustrated in FIG. 5 via the rear window links 32, through an actuation of lever 30, which is driven using the drive apparatus 28. In said storage position, the rear window 18 has a substantially horizontal orientation.

In order to prevent the top 10 from being damaged by an obstacle 37 being arranged in the storage space 20 when it is displaced in the direction of the storage or cleared position, the top 10 is provided with a detection apparatus for identifying obstacles in the storage space 20. The detection apparatus, which, in FIGS. 7 and 8, is illustrated in detail for the rear window link 32 being arranged on the left in relation to the forward direction of travel and which is realized at the rear window link being arranged on the right in relation to the forward direction of travel in a corresponding manner, comprises a microswitch 38, which is mounted to the rear window link 32 and is connected to a control apparatus 42 of the top 10 via a signal line 40, said signal line in turn being connected, via a line 44, to the drive apparatuses 28 being arranged on each of the two sides.

Furthermore, a mounting hole 46 is realized at the rear window link 32, as an elongated hole, a mounting pin 48 being realized as a stepped rivet reaching through said mounting hole. Said mounting pin is arranged at the mounting lug 34 of the frame 36 of the rear window 18 in a rigid fashion. The mounting pin 48 has a face-side plate 50, which constitutes a switching nose, interacting with the microswitch 38 or with a switching spring 54 of the microswitch 38. This means that the rear window link 32 is mounted with a clearance as against the rear window 18.

In order to be able to guarantee, during problem-free operation, a nominal position of the rear window 18 as against the rear window links 32, a spring element 52 being realized as a leg spring is clamped between the rear window link 32 and the mounting pin 48, on the one hand engaging with a face-side hole of the mounting pin 48 and on the other hand engaging with a corresponding hole of the respective rear window link 32.

The detection apparatus that has previously been described, for an obstacle 37, functions in the manner being described in the following.

Figure 3:
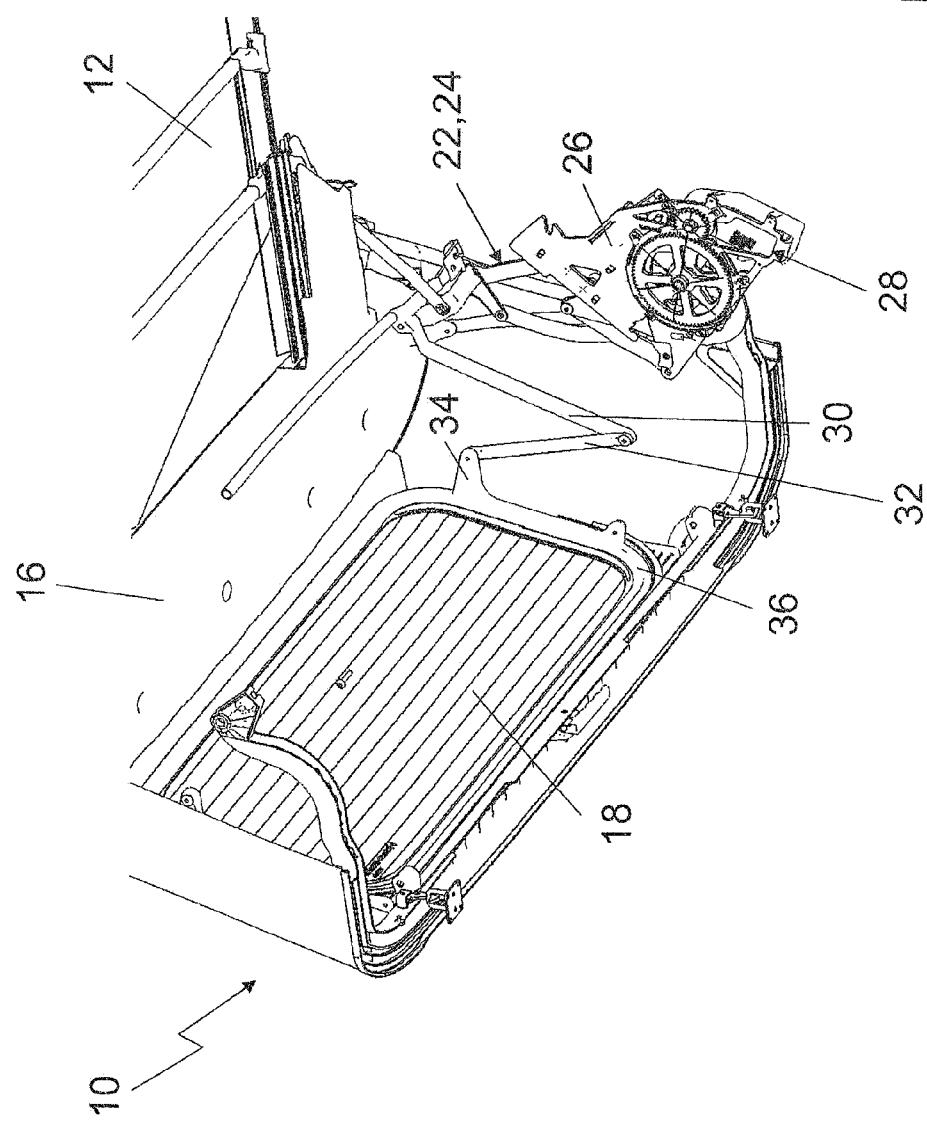
FIG. 3 shows an inside view of the top according to FIG. 1 in the closed position thereof.
Figure 4:
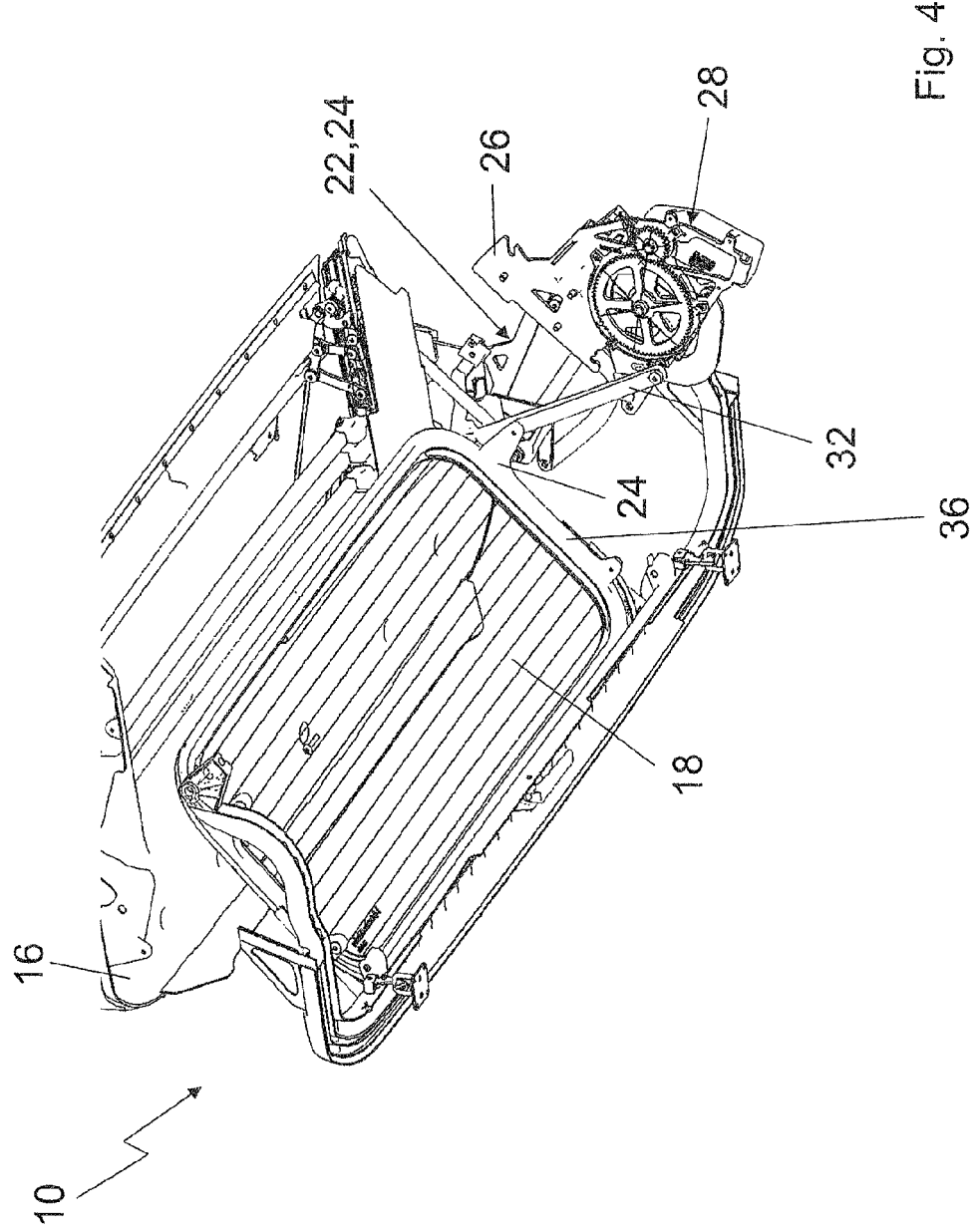
FIG. 4 shows a view corresponding to FIG. 3, but in an intermediate position.

Starting from the viewing position of the rear window 18 being illustrated in FIGS. 1 and 3, the rear window is pivoted forward when the top 10 is being displaced into the cleared position, by actuating the levers 30 and the rear window links 32 being articulated thereto. If an obstacle 37 is now situated in the storage space 20 (cf. FIG. 6), the rear window 18 hits the same. Consequently, the rear window 18 is blocked from being pivoted further. However, a tractive force is still exerted on the rear window links 32 using the drive apparatus 28. Consequently, the rear window links 32 being arranged on each of the two sides are offset as against the rear window 18, to be more precise in that the stepped rivets are advanced in their associated mounting holes 46. Accordingly, the face-side plates 50, constituting a switching nose in each instance, and pertaining to the stepped rivets, hit the switching springs 54 of the microswitches 38, whereby a switching process is performed, wherein a trouble signal is transmitted, using said process, to the control apparatus 42 of the top 10 via the signal line 40. After that, the control apparatus 42 transmits a control signal to the dive apparatuses 28, such that the displacing movement of the top 10 is stopped or also reversed.

Figure 10:
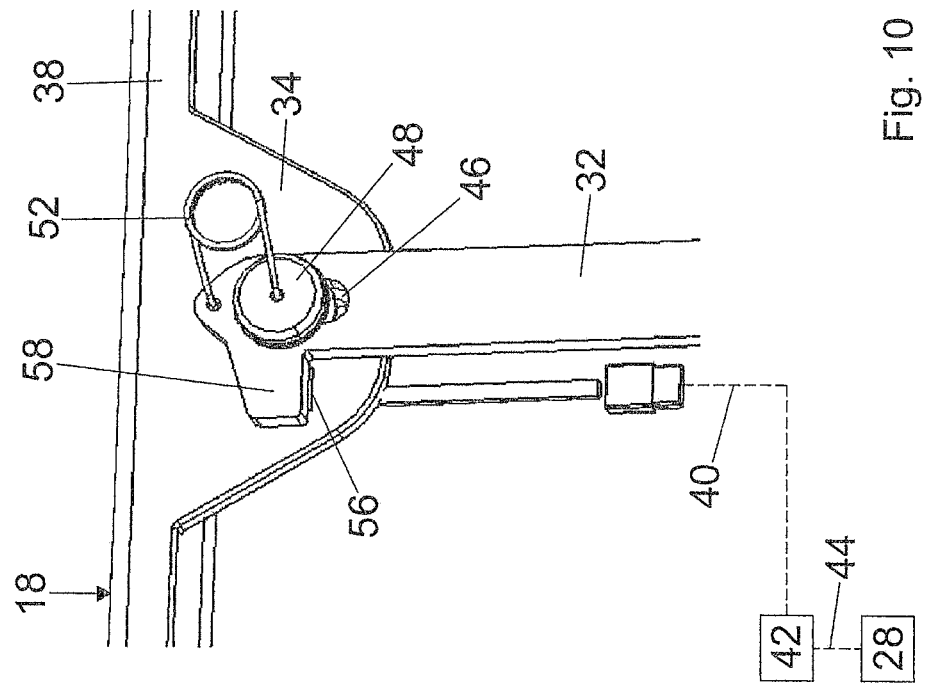
FIG. 10 shows the arrangement according to FIG. 9 when the rear window has hit an obstacle.
Figure 9:
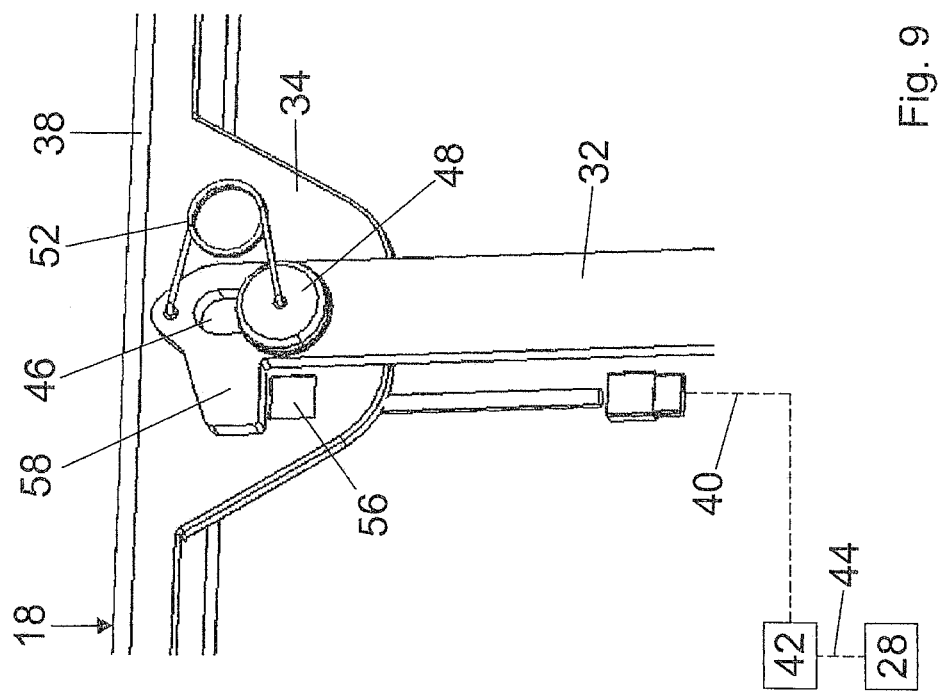
FIG. 9 shows the rear window and a rear window link in the nominal position for an alternative sensor application.

In FIGS. 9 and 10, a further embodiment of a detection apparatus for an obstacle in the storage space 20 is illustrated. This embodiment largely corresponds to the embodiment being illustrated in FIGS. 7 and 8 and only differs from the same in that a switch 56 that functions magnetically is integrated into the mounting lug 34 of the rear window frame 36 instead of a microswitch, said switch interacting with a switching element 58 being realized as a switching nose. The switching element is realized at the rear window link 32. When the rear window link 32 is offset as against the rear window 18, the mounting pin 48 in the elongated hole 46 being advanced from the nominal position in the process, the switching nose 58 is advanced via the switch 56 that functions magnetically, such that a trouble signal is emitted to the control apparatus 42 of the top 10 via the signal line 40 and that the drive apparatuses 28 may be stopped or reversed using the control apparatus 42, through corresponding control signals.

Apart from that, the embodiment according to FIGS. 9 and 10 corresponds to the embodiment according to FIGS. 7 and 8.

Figure 12:
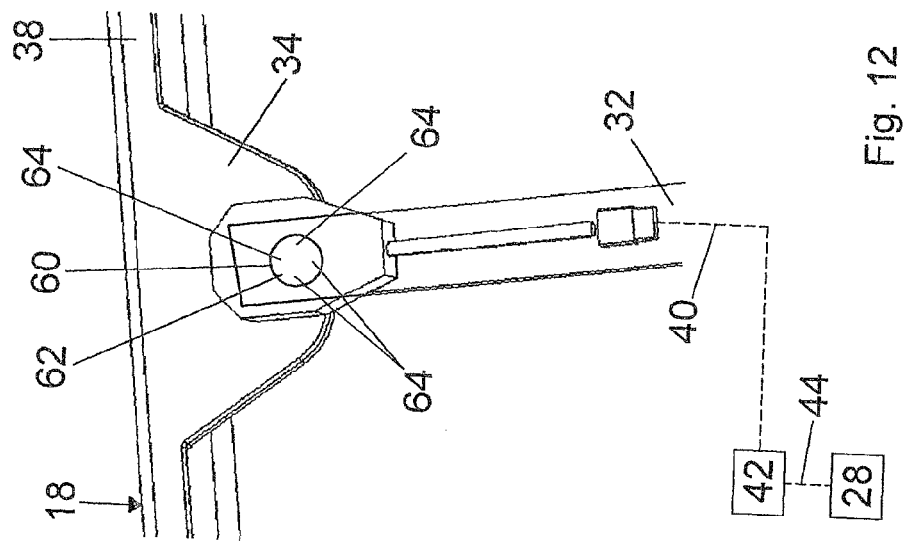
FIG. 12 shows the sensor application according to FIG. 11 without any sensor housing.
Figure 11:
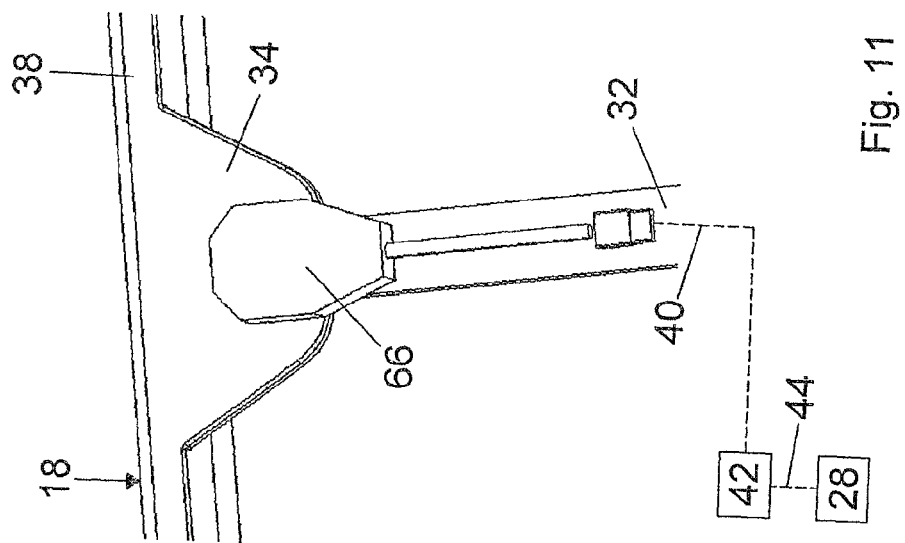
FIG. 11 shows a further embodiment of a sensor application for detecting an obstacle using the rear window.

In FIGS. 11 and 12, a third embodiment of a detection apparatus for an obstacle in the storage space 20 is illustrated. The construction of the associated top again substantially corresponds to the top being illustrated in FIGS. 1 to 6. However, each of the rear window links 32 is provided with a circular large hole 60, which constitutes a mounting hole for a mounting pin 62 and whose diameter is larger than the diameter of the mounting pin 62 (cf. FIG. 12). The mounting pin 62 has been prestressed in the direction of its nominal position using springs 64, the mounting pin 62 in said position being arranged in the center of the large hole 60. If a force is now exerted on the rear window 18 using an obstacle 37 in the storage space 20, the mounting pin 62 is deflected from its nominal position, that means it is arranged eccentrically relating to the large hole 60. Said deflection may be registered by a sensor element 66, whose housing is illustrated in FIG. 11 and which functions electrically, magnetically, optically or mechanically, such that a trouble signal may be forwarded to the control apparatus 42 via a signal line 40. The control apparatus 42 may then forward a control signal to the drive apparatus 28, such that the latter may be stopped or reversed.

Alternatively, the springs 64 may also be formed by a rubber bump, which is provided with a receptacle for the mounting pin 62.

By means of the detection apparatus which is realized in accordance with the invention, and which also comprises the rear window 18, it is possible to detect any obstacles in the storage space 20 in an extensive manner. Detecting is possible throughout the motion sequence of the rear window 18. The detection apparatus can be used for all top systems having rear window links, which are linked to the rear window or to a frame of the same. Additionally, the detection apparatus can be realized in a cost-effective manner and without high additional weight.

The invention claimed is:

1. A top of a convertible vehicle, comprising a linkage (22), wherein, by using said linkage, at least one top element is displaceable between a closed position for spanning a vehicle interior and a cleared position for clearing the vehicle interior to the top and wherein, by using said linkage, a rear window (18), which, in relation to a vertical longitudinal center plane of the top on each of its two sides, is connected to the linkage (22) via a rear window link (32), is displaceable between a lifted viewing position and a lowered storage position, in which the rear window is arranged in a storage space (20), as well as comprising a detection apparatus, which identifies an obstacle (37) in the storage space (20) when the rear window (18) is being displaced from the viewing position in the direction of the storage position and which interacts with a control apparatus (42) of the top, the rear window (18) being part of the detection apparatus.

2. The top according to claim 1, wherein the detection apparatus, when the rear window (18) hits the obstacle (37), stops the displacement of the linkage (22) or reverses it at least partially.

3. The top according to claim 1, wherein each of the rear window links (32) is mounted with a clearance via a mounting hole (46, 60), with which a mounting pin (48, 62) engages, and wherein the obstacle (37) is detected when the respective mounting pin (48, 62) is advanced in the relevant mounting hole (46, 60) from a nominal position.

4. The top according to claim 3, wherein each of the mounting pins (48, 62) is prestressed in the direction of the nominal position using at least one spring element (52, 64).

5. The top according to claim 4, wherein each of the mounting pins (48), for identifying the obstacle, interacts with a microswitch (38), which is connected to the control apparatus (42).

6. The top according to claim 5, wherein a switching element (58) is realized at each of the mounting pins (48), said element switching the microswitch (38).

7. The top according to claim 3, wherein one switch (56) at the very least, functioning magnetically, and being connected to the control apparatus (42), identifies that at least one rear window link (32) has been offset as against the rear window (18).

8. The top according to claim 1, wherein each of the mounting holes (46) is formed from an elongated hole.

9. The top according to claim 1, wherein each of the mounting holes (60) is formed from a large hole, whose diameter is larger than the diameter of the mounting pin (62), wherein it is detected if the relevant mounting pin (62) has been deflected from the nominal position into an eccentric position, using a sensor element (66) functioning electrically, magnetically or optically.

10. The top according to claim 1, wherein each of the mounting pins (48, 62) is connected to the rear window (18)

in a rigid fashion and in that each of the mounting holes (46, 60) is realized at one of the rear window links (32).

\* \* \* \* \*